US012641559B2

(12) United States Patent
Luo et al.

(10) Patent No.: US 12,641,559 B2
(45) Date of Patent: May 26, 2026

(54) FREQUENCY COMPENSATION METHOD AND FREQUENCY COMPENSATION APPARATUS

(71) Applicant: HUAWEI TECHNOLOGIES CO., LTD., Shenzhen (CN)

(72) Inventors: Hejia Luo, Hangzhou (CN); Xiaolu Wang, Hangzhou (CN); Jianwei Zhou, Hangzhou (CN); Ying Chen, Hangzhou (CN); Chenlei Xu, Hangzhou (CN); Jun Wang, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 360 days.

(21) Appl. No.: 18/191,591

(22) Filed: Mar. 28, 2023

(65) Prior Publication Data

US 2023/0247576 A1      Aug. 3, 2023

Related U.S. Application Data

(63) Continuation of application No. PCT/CN2021/116220, filed on Sep. 2, 2021.

(30) Foreign Application Priority Data

Sep. 28, 2020    (CN) .......................... 202011045471.6

(51) Int. Cl.
*H04W 56/00*          (2009.01)
*H04W 72/0453*      (2023.01)
*H04W 72/1268*      (2023.01)

(52) U.S. Cl.
CPC ... *H04W 56/0035* (2013.01); *H04W 72/0453* (2013.01); *H04W 72/1268* (2013.01)

(58) Field of Classification Search
None
See application file for complete search history.

(56)          References Cited

U.S. PATENT DOCUMENTS

2002/0173269 A1*  11/2002  Grayson ............ H04B 7/18502
                                                                      455/12.1
2014/0086083 A1*   3/2014  You ................... H04W 56/0015
                                                                      370/252
(Continued)

FOREIGN PATENT DOCUMENTS

CN          109716689  A      5/2019
WO        2020089471  A1      5/2020

OTHER PUBLICATIONS

Moderator (Thales), "Feature lead Summary on enhancements on UL time and frequency synchronization for NR NTN," 3GPP TSG-RAN WG1 Meeting #102-e, R1-2007290, Aug. 17-28, 2020, 60 pages.

(Continued)

*Primary Examiner* — Benjamin Lamont
(74) *Attorney, Agent, or Firm* — Fish & Richardson P.C.

(57)          ABSTRACT

Example frequency compensation methods and apparatus are described. One example method includes determining first information and sending the first information by a network device to a terminal device, where the first information indicates a frequency compensation manner of an uplink signal of the terminal device or the first information indicates a configuration parameter of the terminal device. The terminal device receives the first information, and determines, based on the first information, the frequency compensation manner to be used to send the uplink signal. The terminal device performs frequency compensation for the uplink signal based on the frequency compensation manner.

16 Claims, 2 Drawing Sheets

(56) References Cited

U.S. PATENT DOCUMENTS

| | | | |
|---|---|---|---|
| 2018/0083730 A1* | 3/2018 | Gulati | H04L 1/0004 |
| 2019/0222239 A1* | 7/2019 | Fox | H04B 1/0096 |
| 2020/0204217 A1 | 6/2020 | Hou et al. | |
| 2020/0350983 A1* | 11/2020 | Alasti | H04B 7/195 |
| 2021/0359752 A1* | 11/2021 | Wang | H04W 24/02 |
| 2022/0038139 A1* | 2/2022 | Eriksson Löwenmark | H04W 72/23 |
| 2022/0286198 A1* | 9/2022 | Khan | H04W 56/0035 |
| 2023/0116580 A1* | 4/2023 | Cheng | H04W 56/0035 370/329 |
| 2023/0179260 A1* | 6/2023 | Abdelghaffar | H04W 72/23 370/329 |

OTHER PUBLICATIONS

Extended European Search Report in European Appln No. 21871243.8, dated Feb. 9, 2024, 14 pages.
International Search Report and Written Opinion in International Appln. No. PCT/CN2021/116220, mailed on Nov. 29, 2021, 15 pages (with English translation).

* cited by examiner

100

102

101

102

200

Network device

Terminal device

S201: Determine first information

S202: First information

S203: Determine a frequency compensation manner based on the first information

S204: Perform frequency compensation for an uplink signal based on the frequency compensation manner

FREQUENCY COMPENSATION METHOD AND FREQUENCY COMPENSATION APPARATUS

CROSS-REFERENCE TO RELATED APPLICATIONS

This application is a continuation of International Application No. PCT/CN2021/116220, filed on Sep. 2, 2021, which claims priority to Chinese Patent Application No. 202011045471.6, filed on Sep. 28, 2020. The disclosures of the aforementioned applications are hereby incorporated by reference in their entireties.

TECHNICAL FIELD

This application relates to the field of satellite communications, and in particular, to a frequency compensation method and a frequency compensation apparatus.

BACKGROUND

Compared with a conventional mobile communication system, satellite communication covers a wide area and can overcome natural geographical obstacles such as oceans, deserts, and high mountains, and communication costs are irrelevant to a communication distance. Therefore, communication quality is high, and system reliability is high. In view of the above advantages of satellite communication, satellite communication can be used as an effective supplement to the conventional mobile communication system.

In a satellite communication system, a satellite moves relative to the ground and a terminal device, causing a Doppler shift. The Doppler shift affects communication quality. Therefore, frequency compensation on the satellite side is a common method in satellite communication. In this case, a network device on the satellite side should notify the terminal device of a Doppler frequency compensation value of a beam, so that the terminal device accurately knows a frequency of a downlink signal when receiving the downlink signal, or accurately knows a frequency to be used when sending an uplink signal.

Therefore, the network device may send the frequency compensation value to the terminal device, but such a manner causes large signaling overheads.

SUMMARY

This application provides a frequency compensation method and a frequency compensation apparatus, to reduce signaling overheads for transmitting a frequency compensation value, thereby improving system performance.

According to a first aspect, a frequency compensation method is provided, including: A terminal device receives first information from a network device, where the first information indicates a frequency compensation manner of an uplink signal of the terminal device, or the first information indicates a configuration parameter of the terminal device. The terminal device determines the frequency compensation manner based on the first information, where the frequency compensation manner is a first frequency compensation manner or a second frequency compensation manner, a first compensation value corresponding to the first frequency compensation manner is a frequency offset generated by relative motion between the network device and the terminal device, and a second compensation value corresponding to the second frequency compensation manner is a difference between a first threshold and the frequency offset generated by relative motion between the network device and the terminal device. The terminal device performs frequency compensation for the uplink signal based on the frequency compensation manner.

In this embodiment of this application, the network device may indicate the frequency compensation manner of the uplink signal of the terminal device in two manners. In a first manner, the first information can explicitly indicate the frequency compensation manner to be used for the uplink signal. This manner is also referred to as an explicit indication manner in this application. In this case, the first information may be indication information including several bits. In a second manner, the first information indicates the configuration parameter of the terminal device, and the terminal device may determine, based on the configuration parameter and further determining, the frequency compensation manner to be used for the uplink signal. This manner is also referred to as an implicit indication manner in this application. In this case, the first information may be the configuration parameter, or may be related information that can be used to determine the configuration parameter. This is not limited in this embodiment of this application.

Therefore, according to the frequency compensation method in this embodiment of this application, the network device may notify the terminal device of the frequency compensation manner of the uplink signal in an explicit indication manner or an implicit indication manner, so that the terminal device performs frequency compensation for the uplink signal by using a frequency compensation manner consistent with that of the network device, so that the network device does not need to notify the terminal device of a specific frequency compensation value. In addition, compensation behavior of the network device is enabled to be consistent with that of the terminal device, to reduce signaling overheads for transmitting a frequency compensation value by the network device while ensuring normal transmission of the uplink signal, thereby improving system performance.

It should be understood that the first threshold may be a positive value, a negative value, or zero. This is not limited in this embodiment of this application. If the first threshold is zero, the second frequency compensation manner is the same as the first frequency compensation manner. The first threshold may also be referred to as another name, for example, a preset frequency offset. This is not limited in this embodiment of this application either.

With reference to the first aspect, in some implementations of the first aspect, the first threshold is determined based on a compensation value of a downlink signal of the network device; or the first threshold is specified in a protocol.

In another possible implementation, the first threshold may alternatively be calculated based on one or more of pieces of information such as an absolute location of the terminal device, a location of the terminal device relative to the network device, or a movement direction of the terminal device relative to the network device with reference to a location and a movement direction of the network device as well as an absolute frequency of the uplink signal sent by the terminal device. This is not limited in this embodiment of this application.

With reference to the first aspect, in some implementations of the first aspect, the first information indicates the frequency compensation manner of the uplink signal of the terminal device. In this case, that the terminal device determines the frequency compensation manner based on the first information includes: If the first information is a first bit value, the terminal device determines, the first frequency compensation manner corresponding to the first bit value, as the frequency compensation manner; or if the first information is a second bit value, the terminal device determines, the second frequency compensation manner corresponding to the second bit value, as the frequency compensation manner.

It should be understood that the protocol may specify that the first bit value corresponds to the first frequency compensation manner, and that the second bit value corresponds to the second frequency compensation manner. For example, the first bit value may be 0, and the second bit value may be 1; or the first bit value may be 1, and the second bit value may be 0.

According to the frequency compensation method in this embodiment of this application, the network device may notify the terminal device of the frequency compensation manner of the uplink signal in an explicit indication manner, so that the terminal device performs frequency compensation for the uplink signal by using a frequency compensation manner consistent with that of the network device, so that the network device does not need to notify the terminal device of a specific frequency compensation value. In addition, compensation behavior of the network device is enabled to be consistent with that of the terminal device, to reduce signaling overheads for transmitting a frequency compensation value by the network device while ensuring normal transmission of the uplink signal, thereby improving system performance.

With reference to the first aspect, in some implementations of the first aspect, a transmit frequency of the uplink signal is a difference between an absolute frequency of the uplink signal and the first compensation value; or a transmit frequency of the uplink signal is a difference between an absolute frequency of the uplink signal and the second compensation value.

It should be understood that, in the first frequency compensation manner, frequencies of uplink signals between beams of the network device may be continuous, and the terminal device does not need to change a frequency when sending the uplink signal. In the second frequency compensation manner, a frequency offset of the uplink signal of the terminal device may be very small, and a frequency near the ground and a guard band of an adjacent band do not change obviously.

Therefore, in this embodiment of this application, different frequency compensation manners can be flexibly selected, to adapt to guard band requirements in a plurality of different scenarios, thereby improving system performance.

With reference to the first aspect, in some implementations of the first aspect, the first information indicates the configuration parameter of the terminal device. In this case, that the terminal device determines the frequency compensation manner based on the first information includes: The terminal device determines, based on the configuration parameter, that the terminal device is in a high-speed moving communication state. The terminal device determines, a frequency compensation manner corresponding to the high-speed moving communication state, as the frequency compensation manner.

The high-speed moving communication state in this embodiment of this application means that the network device or the terminal device or both are in a fast-moving communication state. For example, the network device or the terminal device is a non-geostationary orbit satellite or a high-speed moving aircraft or vehicle. It should be understood that a protocol specifies the frequency compensation manner corresponding to the high-speed moving communication state, and the terminal device can determine the frequency compensation manner corresponding to the high-speed moving communication state provided that the terminal device determines that the network device or the terminal device or both are currently in the high-speed moving communication state. The frequency compensation manner corresponding to the high-speed moving communication state may be the first frequency compensation manner in this embodiment of this application, or may be the second frequency compensation manner in this embodiment of this application.

According to the frequency compensation method in this embodiment of this application, the network device may notify the terminal device of the frequency compensation manner of the uplink signal in an implicit indication manner, so that the terminal device performs frequency compensation for the uplink signal by using a frequency compensation manner consistent with that of the network device, so that the network device does not need to notify the terminal device of a specific frequency compensation value. In addition, compensation behavior of the network device is enabled to be consistent with that of the terminal device, to reduce signaling overheads for transmitting a frequency compensation value by the network device while ensuring normal transmission of the uplink signal, thereby improving system performance.

With reference to the first aspect, in some implementations of the first aspect, the configuration parameter includes location information of a reference point of the network device, and that the terminal device determines the frequency compensation manner based on the first information includes: The terminal device determines, based on the location information of the reference point of the network device, that the terminal device is in a high-speed moving communication state. The terminal device determines, a frequency compensation manner corresponding to the high-speed moving communication state, as the frequency compensation manner.

For example, the network device may notify the terminal device of information such as a location of a specific reference point (for example, a location of a satellite, a high-altitude platform, or an airplane), motion information, and a timestamp, which are collectively referred to as the location information of the reference point in this embodiment of this application. The terminal device may determine, based on a location change status or a speed status of the reference point, that the terminal device is in the high-speed moving communication state.

Optionally, the location information of the reference point of the network device may be carried in any one of the following messages: a broadcast message, a handover configuration message, or a measurement configuration message.

With reference to the first aspect, in some implementations of the first aspect, the configuration parameter includes timestamp information, and that the terminal device determines the frequency compensation manner based on the first information includes: The terminal device determines uplink timing information of the terminal device based on the timestamp information and global navigation satellite system (GNSS) time information. The terminal device determines, based on the uplink timing information, that the terminal device is in a high-speed moving communication state. The terminal device determines a frequency compensation manner corresponding to the high-speed moving communication state, as the frequency compensation manner.

For example, the terminal device may use GNSS time obtained by the terminal device, as a reference, and obtain a moving speed of the network device by determining a change rate of the timestamp information notified by the network device, to determine that the terminal device is in the high-speed moving communication state.

Optionally, the timestamp information may be carried in any one of the following messages: a broadcast message, a handover configuration message, or a measurement configuration message.

With reference to the first aspect, in some implementations of the first aspect, before the determining uplink timing information of the terminal device, the method further includes: The terminal device receives second information from the network device, where the second information indicates the terminal device to determine the uplink timing information. The determining uplink timing information of the terminal device includes: The terminal device determines the uplink timing information of the terminal device based on the second information and based on the timestamp information and the GNSS time information.

Optionally, the second information may be carried in any one of the following messages: a broadcast message, a handover configuration message, or a measurement configuration message.

With reference to the first aspect, in some implementations of the first aspect, the first information may include a cell identifier and/or a beam identifier.

In a possible implementation, the network device may configure one piece of first information for a terminal device in one cell. To be specific, all terminal devices in a coverage area of the cell may send uplink signals to the network device in a frequency compensation manner indicated by the piece of first information. In this case, the first information may include a cell identifier.

In another possible implementation, the network device may configure different first information for different beams in a cell. To be specific, each beam corresponds to respective first information. In this case, the first information may include a beam identifier corresponding to the first information. Further, the first information may further include the beam identifier.

With reference to the first aspect, in some implementations of the first aspect, the first information may be carried in any one of the following messages: a broadcast message, a handover configuration message, or a measurement configuration message.

It should be understood that the second information and the first information may be carried in a same piece of signaling, or may be carried in different pieces of signaling. This is not limited in this embodiment of this application.

According to a second aspect, another frequency compensation method is provided, including: A network device determines first information, where the first information indicates a frequency compensation manner of an uplink signal of a terminal device, or the first information indicates a configuration parameter of the terminal device. The network device sends the first information to the terminal device, where the frequency compensation manner is a first frequency compensation manner or a second frequency compensation manner, a first compensation value corresponding to the first frequency compensation manner is a frequency offset generated by relative motion between the network device and the terminal device, and a second compensation value corresponding to the second frequency compensation manner is a difference between a first threshold and the frequency offset generated by relative motion between the network device and the terminal device.

With reference to the second aspect, in some implementations of the second aspect, the first information includes location information of a reference point and/or timestamp information of the network device.

With reference to the second aspect, in some implementations of the second aspect, the first information further includes a cell identifier and/or a beam identifier.

With reference to the second aspect, in some implementations of the second aspect, the first information is carried in any one of the following messages: a broadcast message, a handover configuration message, or a measurement configuration message.

With reference to the second aspect, in some implementations of the second aspect, the first threshold is determined based on a compensation value of a downlink signal of the network device; or the first threshold is specified in a protocol.

According to a third aspect, a frequency compensation apparatus is provided, and configured to perform the method in any one of the foregoing aspects or the possible implementations of the foregoing aspects. Specifically, the apparatus includes units configured to perform the method according to any one of the foregoing aspects or the possible implementations of the foregoing aspects.

In a design, the apparatus may include modules that one-to-one correspond to the methods/operations/steps/actions described in the foregoing aspects. The module may be implemented by a hardware circuit, software, or a combination of a hardware circuit and software.

In another design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

In another design, the apparatus is configured to perform the method according to any one of the foregoing aspects or the possible implementations of the foregoing aspects. The apparatus may be configured in the foregoing terminal device or network device, or the apparatus itself is the foregoing terminal device or network device.

According to a fourth aspect, another frequency compensation apparatus is provided, including a processor and a memory. The memory is configured to store a computer program, and the processor is configured to invoke the computer program from the memory and run the computer program, so that the apparatus performs the method in any possible implementation of any one of the foregoing aspects.

Optionally, there are one or more processors, and there are one or more memories.

Optionally, the memory may be integrated into the processor, or the memory and the processor are separately disposed.

Optionally, the communication device further includes a transmitter and a receiver. The transmitter and the receiver may be separately disposed, or may be integrated together to obtain a transceiver.

According to a fifth aspect, a communication system is provided, including an apparatus configured to implement the method according to any one of the first aspect or the possible implementations of the first aspect, and an apparatus configured to implement the method according to any one of the second aspect or the possible implementations of the second aspect.

In a possible design, the communication system may further include another device that interacts with a terminal device and/or a network device in the solutions provided in embodiments of this application.

According to a sixth aspect, a computer program product is provided. The computer program product includes a computer program (or may be referred to as code or instructions). When the computer program is run, a computer is enabled to perform the method according to any possible implementation of any aspect.

According to a seventh aspect, a computer-readable medium is provided. The computer-readable medium stores a computer program (or may be referred to as code or instructions). When the computer program is run on a computer, the computer is enabled to perform the method according to any possible implementation of any aspect.

According to an eighth aspect, a communication apparatus is provided, including a communications interface and a logic circuit. The communications interface is configured to receive first information, and the logic circuit is configured to perform frequency compensation for an uplink signal based on the first information, so that the communications apparatus performs the method in any possible implementation of the first aspect.

According to a ninth aspect, another communication apparatus is provided, including a communications interface and a logic circuit. The logic circuit is configured to determine first information, and the communications interface is configured to send the first information, so that the communications apparatus performs the method in any possible implementation of the second aspect.

DESCRIPTION OF EMBODIMENTS

Figure 1:
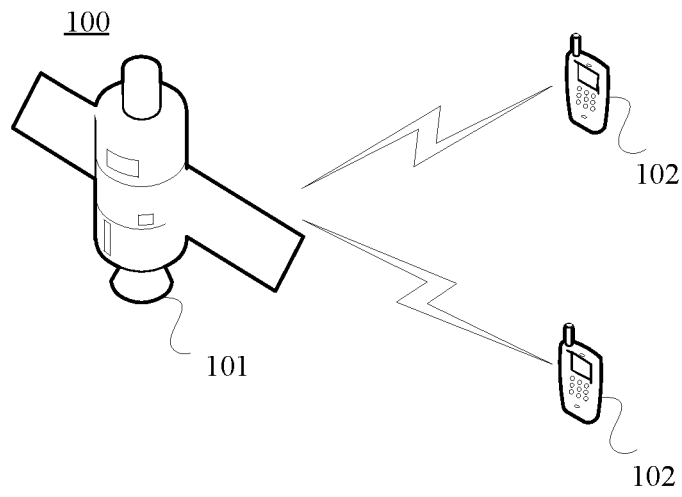
FIG. 1 is a schematic diagram of a communication system according to an embodiment of this application.

The following describes technical solutions in this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a 5th generation (5G) system, new radio (NR), or another evolved communication system.

A terminal device in embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some terminals are, for example, a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a hand-held device or a computing device that has a wireless communication function or another processing device connected to a wireless modem, a vehicle-mounted device, a wearable device, a terminal device in a 5G network, and a terminal device in a future evolved public land mobile network (PLMN). This is not limited in embodiments of this application.

As an example instead of a limitation, in embodiments of this application, the terminal device may be a wearable device. The wearable device may also be referred to as a wearable intelligent device, and is a general term for wearable devices, such as glasses, gloves, watches, clothes, and shoes, that are developed by applying wearable technologies to intelligent designs of daily wearables. The wearable device is a portable device that is directly worn on a body or integrated into clothes or an accessory of a user. The wearable device is not only a hardware device, but also implements a powerful function through software support, data exchange, and cloud interaction. In a broad sense, intelligent wearable devices include full-featured and large-size devices that can implement complete or partial functions without depending on smartphones, for example, smart watches or smart glasses, and include devices that focus only on a specific type of application and need to be used together with another device such as a smartphone, for example, various smart bands and smart jewelry used for vital sign monitoring.

In addition, in embodiments of this application, the terminal device may alternatively be a terminal device in an internet of things (IoT) system. The IoT is an important part of future development of information technologies. A main technical feature of the IoT is connecting things to a network by using a communication technology, to implement an intelligent network for human-machine interconnection and thing-thing interconnection.

In addition, the network device in embodiments of this application may be a device configured to communicate with the terminal device. The network device may also be referred to as an access network device or a radio access network device, and may be a transmission/reception point (TRP), or may be an evolved NodeB (eNB, or eNodeB) in an LTE system, or may be a home NodeB (for example, home evolved NodeB, or home NodeB, HNB) or a baseband unit (BBU), or may be a radio controller in a cloud radio access network (CRAN) scenario. Alternatively, the network device may be a relay station, an access point, an in-vehicle device, a wearable device, a network device in a 5G network, a network device in a future evolved PLMN network, or the like, may be an access point (AP) in a WLAN, may be a gNB in a new radio (NR) system, or may be a satellite base station in a satellite communication system or the like. This is not limited in embodiments of this application.

In a network structure, the network device may include a central unit (CU) node, a distributed unit (DU) node, a RAN device including a CU node and a DU node, or a RAN device including a control plane CU node (CU-CP node), a user plane CU node (CU-UP node), and a DU node.

The network device serves a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of a small coverage area and low transmit power, and are applicable to providing a high-rate data transmission service.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or by a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

For ease of understanding embodiments of this application, a communication system applicable to embodiments of this application is first described in detail with reference to FIG. 1.

FIG. 1 is a schematic diagram of a communication system 100 according to an embodiment of this application. As shown in FIG. 1, the communication system 100 may include a network device 101 and at least one terminal device 102. The network device 101 and the at least one terminal device 102 may perform wireless communication. Specifically, the network device 101 may send downlink data to the terminal device 102, and the network device 101 may encode the downlink data by using channel coding, and then send data obtained after the channel coding to the terminal device 102 after constellation modulation. The terminal device 102 may send uplink data to the network device 101, and the terminal device 102 may encode the uplink data by using channel coding, and then send encoded data to the network device 101 after constellation modulation.

The communication system 100 in this embodiment of this application may include non-terrestrial network (NTN) communication scenarios such as satellite communication, inter-satellite communication, an air-to-ground network (air-to-ground, ATG), a high-altitude platform (high-altitude platform station, HAPS), and an unmanned aerial vehicle (UAV). In the foregoing scenario, the network device 101 moves relative to the ground at a high speed, and there is a speed and acceleration. Consequently, a carrier offset occurs in a communication process between the network device 101 and the terminal device 102. Such an offset is referred to as a Doppler shift. The Doppler shift causes difficulty in data demodulation in a communication process, and affects quality of communication between the network device 101 and the terminal device 102. Therefore, the network device 101 and the terminal device 102 need to compensate for the Doppler shift, to implement frequency synchronization between the network device 101 and the terminal device 102, thereby improving quality of communication between the network device 101 and the terminal device 102.

Compensation for a Doppler shift of the network device may include two manners: pre-compensation and post-compensation. The pre-compensation means that the network device offsets a frequency of a downlink signal when sending the downlink signal, and an offset thereof is a common part of Doppler offsets in a beam coverage area, so that a frequency offset of the downlink signal received by the terminal device is reduced. The post-compensation means that the network device performs overall frequency offset on a received uplink signal, or the network device performs overall frequency offset on a receiving frequency window, and an offset thereof is a common part of Doppler offsets in a beam coverage area, to reduce a frequency compensation value required for sending the uplink signal by the terminal device. The pre-compensation may also be referred to as Doppler pre-compensation or another name, and the post-compensation may also be referred to as Doppler post-compensation or another name. This is not limited in this embodiment of this application.

Before signal transmission, the network device usually uses two Doppler shift compensation manners. One manner is not to perform pre-compensation, and the other manner is to perform pre-compensation. Correspondingly, the terminal device generates at least two options when performing uplink frequency compensation. One option is to compensate for all Doppler shifts, and another option is to compensate for some Doppler shifts.

In this case, the network device may notify the terminal device of a Doppler frequency compensation value of a beam, so that the terminal device accurately knows a frequency of a downlink signal when receiving the downlink signal, or accurately knows a frequency to be used when sending an uplink signal.

However, if the network device does not notify the terminal device of the frequency compensation value, the terminal device cannot determine which one of the at least two options is to be used, behavior of the terminal device is uncertain, and the terminal device cannot determine an accurate transmit frequency of the uplink signal. Consequently, the network device may fail to receive the uplink signal, causing transmission failure of the uplink signal. If the network device notifies the terminal device of the frequency compensation value, large signaling overheads are caused.

In view of this, this application provides a frequency compensation method and a frequency compensation apparatus, without a need for a network device to notify a terminal device of a specific frequency compensation value. In addition, compensation behavior of the network device is enabled to be consistent with that of the terminal device, to reduce signaling overheads for transmitting a frequency compensation value, thereby improving system performance.

For ease of understanding of embodiments of this application, the following descriptions are provided.

1. In embodiments of this application, "used for indication" may include "used for direct indication" and "used for indirect indication", or may include "used for explicit indication" and "used for implicit indication". Information indicated by specific information is referred to as to-be-indicated information. In a specific implementation process, the to-be-indicated information may be indicated in a plurality of manners, for example, but not limited to, a manner of directly indicating the to-be-indicated information. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or specified in advance. For example, it may alternatively be specified in advance (for example, specified in a protocol) that the to-be-indicated information is to be indicated depending on whether an information element exists, thereby reducing indication overheads to some extent.

2. In embodiments shown below, "first", "second", "third", and various numbers are merely used for distinguishing for ease of description, and are not intended to limit the scope of embodiments of this application. For example, they are used to distinguish between different information, and different frequency compensation manners, and the like.

3. In embodiments shown below, "predefinition" may be definition in a protocol. "Predefinition" may be implemented by prestoring corresponding code or a corresponding table in a device (for example, including a terminal device and a network device), or in another manner that can be used to indicate related information. A specific implementation of "predefinition" is not limited in this application.

4. "Protocol" in embodiments of this application may be a standard protocol in the field of communications, for example, may include a long term evolution (LTE) protocol, a new radio (NR) protocol, and a related protocol applied to a future communication system. This is not limited in this application.

The following describes, in detail, embodiments provided in this application.

Embodiments of this application are described by using a terminal device and a network device as examples. It should be understood that the terminal device may be replaced with an apparatus or a chip that can implement a function similar to that of the terminal device, and the network device may also be replaced with an apparatus or a chip that can implement a function similar to that of the network device. A name thereof is not limited in embodiments of this application.

Figure 2:
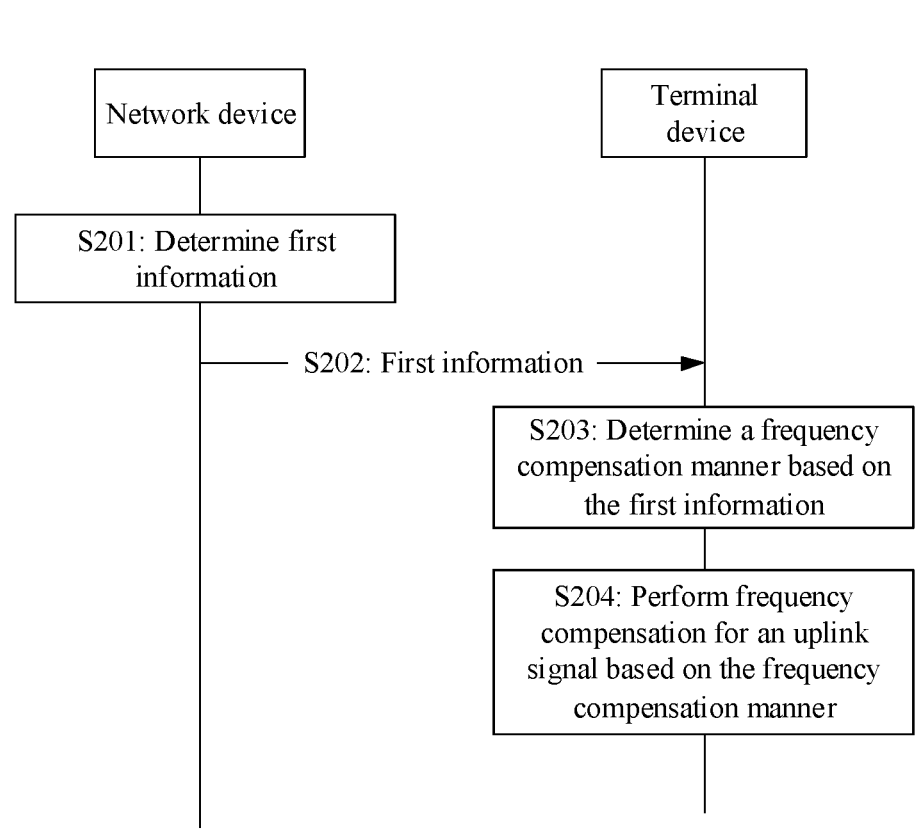
FIG. 2 is a schematic flowchart of a frequency compensation method according to an embodiment of this application.

FIG. 2 is a schematic flowchart of a frequency compensation method 200 according to an embodiment of this application. The method 200 may be applied to the communication system 100 shown in FIG. 1. However, this embodiment of this application is not limited thereto. As shown in FIG. 2, the method 200 may include the following steps.

S201: A network device determines first information, where the first information indicates a frequency compensation manner of an uplink signal of a terminal device, or the first information indicates a configuration parameter of the terminal device. The frequency compensation manner is a first frequency compensation manner or a second frequency compensation manner. A first compensation value corresponding to the first frequency compensation manner is a frequency offset generated by relative motion between the network device and the terminal device. A second compensation value corresponding to the second frequency compensation manner is a difference between a first threshold and the frequency offset generated by relative motion between the network device and the terminal device.

S202: The network device sends the first information to the terminal device, and correspondingly, the terminal device receives the first information.

S203: The terminal device determines, based on the first information, a frequency compensation manner to be used by the terminal device to send the uplink signal.

S204: The terminal device performs frequency compensation for the uplink signal based on the frequency compensation manner.

In this embodiment of this application, the network device may indicate the frequency compensation manner of the uplink signal of the terminal device in two manners. In a first manner, the first information can explicitly indicate the frequency compensation manner to be used for the uplink signal. This manner is also referred to as an explicit indication manner in this application. In this case, the first information may be indication information including several bits. In a second manner, the first information indicates the configuration parameter of the terminal device, and the terminal device may determine, based on the configuration parameter and further determining, the frequency compensation manner to be used for the uplink signal. This manner is also referred to as an implicit indication manner in this application. In this case, the first information may be the configuration parameter, or may be related information that can be used to determine the configuration parameter. This is not limited in this embodiment of this application.

Therefore, according to the frequency compensation method in this embodiment of this application, the network device may notify the terminal device of the frequency compensation manner of the uplink signal in an explicit indication manner or an implicit indication manner, so that the terminal device performs frequency compensation for the uplink signal by using a frequency compensation manner consistent with that of the network device, so that the network device does not need to notify the terminal device of a specific frequency compensation value. In addition, compensation behavior of the network device is enabled to be consistent with that of the terminal device, to reduce signaling overheads for transmitting a frequency compensation value by the network device while ensuring normal transmission of the uplink signal, thereby improving system performance.

It should be understood that the first threshold may be a positive value, a negative value, or zero. This is not limited in this embodiment of this application. If the first threshold is zero, the second frequency compensation manner is the same as the first frequency compensation manner. The first threshold may also be referred as another name, for example, a preset frequency offset. This is not limited in this embodiment of this application either.

In an optional embodiment, the first threshold is determined based on a compensation value of a downlink signal of the network device; or the first threshold is specified in a protocol.

In a possible implementation, the first threshold is determined based on the compensation value of the downlink signal of the network device. For example, if the compensation value of the downlink signal is an absolute frequency value, for example, is measured in hertz (Hz), the first threshold may be calculated according to the following formula:

$$fpre = \frac{fpreDL}{fDLref} * fULref$$

where fpre is the first threshold, fpreDL is a compensation value of the downlink signal, fDLref is an absolute frequency of the downlink signal, and fULref is an absolute frequency of the uplink signal.

It should be understood that a carrier in a cell may have a specific width, and a cell may have a plurality of carriers. For example, in an LTE system, a cell using a carrier aggregation mode may include a plurality of carriers, or in an NR system, a plurality of bandwidth parts (BWP) located at different frequencies may be deployed. Therefore, that the network device performs Doppler pre-compensation and/or Doppler post-compensation for a carrier is usually compensation for a given frequency. A larger offset of a given frequency in cell bandwidth indicates a larger residual frequency offset. If values of fDLref and fULref used when the terminal device calculates an uplink compensation frequency (namely, the foregoing second compensation value) are inconsistent with those expected by the network device, a frequency of an uplink signal received by the network device is inaccurate, thereby affecting communication performance. Therefore, values of fDLref and fULref may be specified in a protocol, or may be notified by the network device to the terminal device. This is not limited in this embodiment of this application. In a possible implementation, it may be specified in the protocol that values of fDLref and fULref are central positions of a carrier by default, for example, a position of a central subcarrier, or a position of a center subcarrier plus or minus 1.

For example, if the compensation value of the downlink signal is measured in a relative proportional relationship, for example, measured in parts per million (PPM), the first threshold may be calculated according to the following formula:

$$fpre=fpreDL*fULref$$

In another possible implementation, the first threshold is specified in the protocol. For example, the first threshold may be ½ of a Doppler shift, which is:

$$fpre = \frac{fd}{2}$$

It should be understood that, in another possible implementation, the first threshold may alternatively be calculated based on one or more of pieces of information such as an absolute location of the terminal device, a location of the terminal device relative to the network device, or a movement direction of the terminal device relative to the network device with reference to a location and a movement direction of the network device as well as an absolute frequency of the uplink signal sent by the terminal device. This is not limited in this embodiment of this application.

In an optional embodiment, after S204, the terminal device may send the uplink signal to the network device on a compensated frequency.

It should be understood that, if the frequency compensation manner is the first frequency compensation manner, the network device may not perform any compensation operation, and can receive the uplink signal on an original frequency. If the frequency compensation manner is the second frequency compensation manner, the network device may receive the uplink signal by using a frequency obtained after offset, or perform subsequent compensation for the received signal. This is not limited in this embodiment of this application.

Optionally, if the frequency compensation manner of the uplink signal is the first frequency compensation manner, a transmit frequency of the uplink signal is the absolute frequency of the uplink signal offset by the first compensation value. The first compensation value is a frequency offset generated by relative motion between the network device and the terminal device, which is referred to as a Doppler shift fd in this embodiment of this application. Therefore, the transmit frequency of the uplink signal is: fULref-fd. It should be understood that fd may be a positive value, a negative value, or zero. This is not limited in this embodiment of this application.

Optionally, if the frequency compensation manner of the uplink signal is the second frequency compensation manner, the transmit frequency of the uplink signal is the absolute frequency of the uplink signal offset by the second compensation value. The second compensation value is a difference between the first threshold and the frequency offset generated by relative motion between the network device and the terminal device. Therefore, the transmit frequency of the uplink signal is: fULref-(fd-fpre).

It should be understood that, in the first frequency compensation manner, frequencies of uplink signals between beams of the network device may be continuous, and the terminal device does not need to change a frequency when sending the uplink signal. In the second frequency compensation manner, a frequency offset of the uplink signal of the terminal device may be very small, and a frequency near the ground and a guard band of an adjacent band do not change obviously.

It should be further understood that whether the network device selects the first frequency compensation manner or the second frequency compensation manner depends on a frequency allocation status of a service of the network device. Specifically, the first frequency compensation manner is more applicable to a scenario in which a beam of the network device is far away from the ground, and one network device has a plurality of beams with different directions. Because there is no offset between frequencies of beams on the network device side, an original guard band can be maintained. Although there is a frequency offset problem on the terminal device side, a beam of the network device is wide, an overall spacing between terminal devices on beams is large, and interference caused by a frequency offset near the ground is not greatly affected. The second frequency compensation manner is more applicable to a scenario in which a service frequency of a network device is adjacent to a service frequency of the ground, because a frequency of a beam of the network device near the ground and a guard band of an adjacent band do not significantly change.

Therefore, in this embodiment of this application, different frequency compensation manners can be flexibly selected, to adapt to guard band requirements in a plurality of different scenarios, thereby improving system performance.

The following describes in detail two manners of explicit indication and implicit indication corresponding to the first information in this embodiment of this application.

Manner 1: The first information indicates the frequency compensation manner of the uplink signal of the terminal device.

In this case, that the terminal device determines a frequency compensation manner based on the first information in S203 includes: If the first information is a first bit value, the terminal device determines, the first frequency compensation manner corresponding to the first bit value, as the frequency compensation manner; or if the first information is a second bit value, the terminal device determines, the second frequency compensation manner corresponding to the second bit value, as the frequency compensation manner.

It should be understood that the protocol may specify that the first bit value corresponds to the first frequency compensation manner, and that the second bit value corresponds to the second frequency compensation manner. For example, the first bit value may be 0, and the second bit value may be 1; or the first bit value may be 1, and the second bit value may be 0.

According to the frequency compensation method in this embodiment of this application, the network device may notify the terminal device of the frequency compensation manner of the uplink signal in an explicit indication manner, so that the terminal device performs frequency compensation for the uplink signal by using a frequency compensation manner consistent with that of the network device, so that the network device does not need to notify the terminal device of a specific frequency compensation value. In addition, compensation behavior of the network device is enabled to be consistent with that of the terminal device, to reduce signaling overheads for transmitting a frequency compensation value by the network device while ensuring normal transmission of the uplink signal, thereby improving system performance.

Manner 2: The first information indicates the configuration parameter of the terminal device.

In this case, that the terminal device determines a frequency compensation manner based on the first information in S203 includes: The terminal device determines, based on the configuration parameter, that the terminal device is in a high-speed moving communication state. The terminal device determines, a frequency compensation manner corresponding to the high-speed moving communication state, as the frequency compensation manner.

The high-speed moving communication state in this embodiment of this application means that the network device or the terminal device or both are in a fast-moving communication state. For example, the network device or the terminal device is a non-geostationary orbit satellite or a high-speed moving aircraft or vehicle. It should be understood that a protocol specifies the frequency compensation manner corresponding to the high-speed moving communication state, and the terminal device can determine the frequency compensation manner corresponding to the high-speed moving communication state provided that the terminal device determines that the network device or the terminal device or both are currently in the high-speed moving communication state. The frequency compensation manner corresponding to the high-speed moving communication state may be the first frequency compensation manner in this embodiment of this application, or may be the second frequency compensation manner in this embodiment of this application.

According to the frequency compensation method in this embodiment of this application, the network device may notify the terminal device of the frequency compensation manner of the uplink signal in an implicit indication manner, so that the terminal device performs frequency compensation for the uplink signal by using a frequency compensation manner consistent with that of the network device, so that the network device does not need to notify the terminal device of a specific frequency compensation value. In addition, compensation behavior of the network device is enabled to be consistent with that of the terminal device, to reduce signaling overheads for transmitting a frequency compensation value by the network device while ensuring normal transmission of the uplink signal, thereby improving system performance.

In this embodiment of this application, the configuration parameter of the terminal device may include many types of parameters, for example, location information of a reference point and timestamp information of the network device. It should be understood that any configuration parameter that can be used to determine that the terminal device is in the high-speed moving communication state falls within the protection scope of embodiments of this application.

In an optional embodiment, the configuration parameter includes location information of a reference point of the network device, and the foregoing S203 includes: The terminal device determines, based on the location information of the reference point of the network device, that the terminal device is in a high-speed moving communication state. The terminal device determines, a frequency compensation manner corresponding to the high-speed moving communication state, as the frequency compensation manner.

For example, the network device may notify the terminal device of information such as a location of a specific reference point (for example, a location of a satellite, a high-altitude platform, or an airplane), motion information, and a timestamp, which are collectively referred to as the location information of the reference point in this embodiment of this application. The terminal device may determine, based on a location change status or a speed status of the reference point, that the terminal device is in the high-speed moving communication state.

Optionally, the location information of the reference point of the network device may be carried in any one of the following messages: a broadcast message, a handover configuration message, or a measurement configuration message.

In an optional embodiment, the configuration parameter includes the timestamp information, and the foregoing S203 includes: The terminal device determines uplink timing information of the terminal device based on the timestamp information and global navigation satellite system (GNSS) time information. The terminal device determines, based on the uplink timing information, that the terminal device is in a high-speed moving communication state. The terminal device determines, a frequency compensation manner corresponding to the high-speed moving communication state, as the frequency compensation manner.

For example, the terminal device may use, GNSS time obtained by the terminal device, as a reference, and obtain a moving speed of the network device by determining a change rate of the timestamp information notified by the network device, to determine that the terminal device is in the high-speed moving communication state.

The timestamp information may be carried in any one of the following messages: a broadcast message, a handover configuration message, or a measurement configuration message.

In an optional embodiment, before the determining uplink timing information of the terminal device, the method further includes: The network device sends second information to the terminal device, where the second information indicates the terminal device to determine the uplink timing information, and correspondingly, the terminal device receives the second information. The determining uplink timing information of the terminal device includes: The terminal device determines the uplink timing information of the terminal device based on the second information and based on the timestamp information and the GNSS time information.

The second information may be carried in any one of the following messages: a broadcast message, a handover configuration message, or a measurement configuration message. It should be understood that the second information and the first information may be carried in a same piece of signaling, or may be carried in different pieces of signaling. This is not limited in this embodiment of this application.

In addition to the foregoing Manner 1 and Manner 2, a protocol may specify a frequency compensation manner of the terminal device when indication of the first information is default, to further reduce indication signaling overheads. For example, when the network device does not indicate the first information (that is, the network device skips sending the first information to the terminal device), the protocol may specify that the terminal device uses the first frequency compensation manner, or that the terminal device uses the second frequency compensation manner.

In an optional embodiment, the first information may include a cell identifier and/or a beam identifier.

In a possible implementation, the network device may configure one piece of first information for a terminal device in one cell. To be specific, all terminal devices in a coverage area of the cell may send uplink signals to the network device in a frequency compensation manner indicated by the first information. In this case, the first information may include a cell identifier.

In another possible implementation, the network device may configure different first information for different beams in a cell. To be specific, each beam corresponds to respective first information. In this case, the first information may include a beam identifier corresponding to the first information. Further, the first information may further include the beam identifier.

It should be understood that the frequency compensation method provided in this embodiment of this application may be applicable to a current serving cell or a beam of a current serving cell. Optionally, the beam may be mapped to a logical entity such as a synchronization signal block (SSB), a BWP, a channel state information reference signal (CSI-RS) port, or a transmission configuration indicator (TCI). Therefore, the beam configuration information may be carried in configuration parameters of these logical entities.

It should be further understood that the frequency compensation method provided in this embodiment of this application may also be applicable to a target cell or a beam of the target cell in a handover process. Optionally, the beam may be mapped to a logical entity such as an SSB, a CSI-RS, a TCI, or a BWP.

In an optional embodiment, the first information may be carried in any one of the following messages: a broadcast message, a handover configuration message, or a measurement configuration message.

For example, the network device may add the first information to system information block (SIB) signaling, and send the SIB signal to the terminal device through a broadcast channel.

For example, the network device may alternatively add the first information to radio resource control (RRC) signaling, and send the RRC signaling to the terminal device in a handover or measurement process.

It should be understood that sequence numbers of the foregoing processes do not mean an execution sequence. The execution sequence of the processes should be determined based on functions and internal logic of the processes, and should not be constructed as any limitation on the implementation processes of embodiments of this application.

The method in embodiments of this application is described above in detail with reference to FIG. 1 and FIG. 2. Apparatuses in embodiments of this application are described below in detail with reference to FIG. 3 and FIG. 4.

Figure 3:
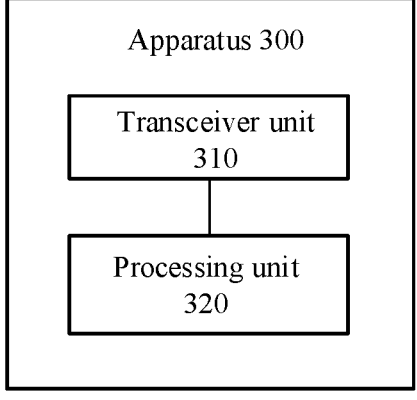
FIG. 3 is a schematic block diagram of a frequency compensation apparatus according to an embodiment of this application.

FIG. 3 shows a frequency compensation apparatus 300 according to an embodiment of this application. The apparatus 300 may be a terminal device, or may be a chip in a terminal device. In another design, the apparatus 300 may be a network device, or may be a chip in a network device. The apparatus 300 includes a transceiver unit 310 and a processing unit 320.

In a possible implementation, the apparatus 300 is configured to perform processes and steps corresponding to the terminal device in the foregoing method embodiments.

The transceiver unit 310 is configured to receive first information from the network device, where the first information indicates a frequency compensation manner of an uplink signal of the terminal device, or the first information indicates a configuration parameter of the terminal device.

The processing unit 320 is configured to determine the frequency compensation manner based on the first information, and perform frequency compensation for the uplink signal based on the frequency compensation manner. The frequency compensation manner is a first frequency compensation manner or a second frequency compensation manner. A first compensation value corresponding to the first frequency compensation manner is a frequency offset generated by relative motion between the network device and the apparatus. A second compensation value corresponding to the second frequency compensation manner is a difference between a first threshold and the frequency offset generated by relative motion between the network device and the apparatus.

Optionally, the first threshold is determined based on a compensation value of a downlink signal of the network device; or the first threshold is specified in a protocol.

Optionally, the first information indicates the frequency compensation manner of the uplink signal of the apparatus. The processing unit 320 is specifically configured to: if the first information is a first bit value, determine, the first frequency compensation manner corresponding to the first bit value, as the frequency compensation manner; or if the first information is a second bit value, determine, the second frequency compensation manner corresponding to the second bit value, as the frequency compensation manner.

Optionally, a transmit frequency of the uplink signal is a difference between an absolute frequency of the uplink signal and the first compensation value; or a transmit frequency of the uplink signal is a difference between an absolute frequency of the uplink signal and the second compensation value.

Optionally, the configuration parameter includes location information of a reference point of the network device. The processing unit 320 is further configured to: determine, based on the configuration parameter, that the apparatus is in a high-speed moving communication state; and determine, a frequency compensation manner corresponding to the high-speed moving communication state, as the frequency compensation manner.

Optionally, the configuration parameter includes location information of a reference point of the network device. The processing unit 320 is specifically configured to: determine, based on the location information of the reference point of the network device, that the apparatus is in a high-speed moving communication state; and determine, a frequency compensation manner corresponding to the high-speed moving communication state, as the frequency compensation manner.

Optionally, the configuration parameter includes timestamp information. The processing unit 320 is further configured to: determine uplink timing information based on the timestamp information and global navigation satellite system GNSS time information; determine, based on the uplink timing information, that the apparatus is in a high-speed moving communication state; and determine, a frequency compensation manner corresponding to the high-speed moving communication state, as the frequency compensation manner.

Optionally, the transceiver unit 310 is specifically configured to receive second information before the uplink timing information is determined, where the second information indicates the uplink timing information. The processing unit 320 is specifically configured to determine the uplink timing information based on the second information and based on the timestamp information and the global navigation satellite system GNSS time information.

Optionally, the first information further includes a cell identifier and/or a beam identifier.

Optionally, the first information is carried in any one of the following messages: a broadcast message, a handover configuration message, or a measurement configuration message.

In another possible implementation, the apparatus 300 is configured to perform processes and steps corresponding to the network device in the foregoing method embodiments.

The processing unit 320 is configured to determine first information, where the first information indicates a frequency compensation manner of an uplink signal of the terminal device, or the first information indicates a configuration parameter of the terminal device.

The transceiver unit 310 is configured to send the first information to the terminal device.

The frequency compensation manner is a first frequency compensation manner or a second frequency compensation manner. A first compensation value corresponding to the first frequency compensation manner is a frequency offset generated by relative motion between the apparatus and the terminal device. A second compensation value corresponding to the second frequency compensation manner is a difference between a first threshold and the frequency offset generated by relative motion between the apparatus and the terminal device.

Optionally, the first information includes location information of a reference point and/or timestamp information.

Optionally, the transceiver unit 310 is further configured to send second information to the terminal device, where the second information indicates the terminal device to determine uplink timing information based on the timestamp information.

Optionally, the first information further includes a cell identifier and/or a beam identifier.

Optionally, the first information is carried in any one of the following messages: a broadcast message, a handover configuration message, or a measurement configuration message.

Optionally, the first threshold is determined based on a compensation value of a downlink signal of the network device; or the first threshold is specified in a protocol.

It should be understood that the apparatus 300 herein is embodied in a form of functional units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another proper component that supports the described function. In an optional example, a person skilled in the art may understand that the apparatus 300 may be specifically the terminal device or the network device in the foregoing embodiments, and the apparatus 300 may be configured to perform processes and/or steps corresponding to the terminal device or the network device in the foregoing method embodiments. To avoid repetition, details are not described herein again.

The apparatus 300 in the foregoing solutions has functions of implementing corresponding steps performed by the terminal device or the network device in the foregoing method. The foregoing functions may be implemented by hardware, or may be implemented by hardware executing corresponding software. The hardware or the software includes one or more modules corresponding to the foregoing functions. For example, the transceiver unit 310 may include a sending unit and a receiving unit. The sending unit may be configured to implement steps and/or processes that correspond to the transceiver unit and that are used to perform a sending action, and the receiving unit may be configured to implement steps and/or processes that correspond to the transceiver unit and that are used to perform a receiving action. The sending unit may be replaced with a transmitter, and the receiving unit may be replaced with a receiver, to separately perform receiving and sending operations and related processing operations in the method embodiments.

In this embodiment of this application, the apparatus 300 in FIG. 3 may alternatively be a chip or a chip system, for example, a system-on-chip (SoC). Correspondingly, the transceiver unit 310 may be a transceiver circuit of the chip. This is not limited herein.

Figure 4:
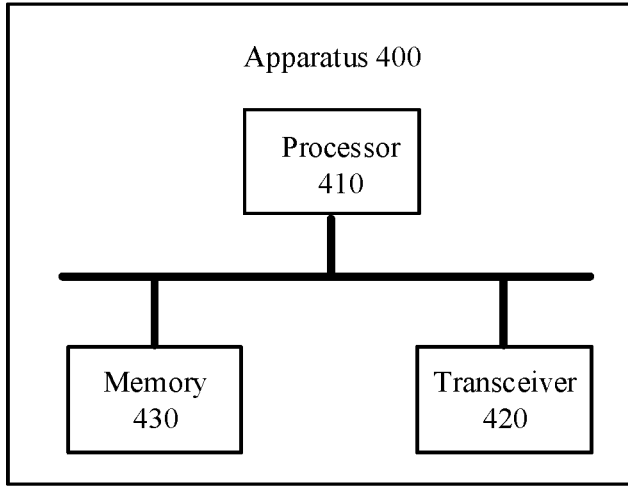
FIG. 4 is a schematic block diagram of another frequency compensation apparatus according to an embodiment of this application.

FIG. 4 shows another frequency compensation apparatus 400 according to an embodiment of this application. The apparatus 400 includes a processor 410, a transceiver 420, and a memory 430. The processor 410, the transceiver 420, and the memory 430 communicate with each other through an internal connection path. The memory 430 is configured to store instructions. The processor 410 is configured to execute the instructions stored in the memory 430, to control the transceiver 420 to send a signal and/or receive a signal.

In a possible implementation, the apparatus 400 is configured to perform processes and steps corresponding to the terminal device in the foregoing method 200.

The transceiver 420 is configured to receive first information from a network device, where the first information indicates a frequency compensation manner of an uplink signal of the terminal device, or the first information indicates a configuration parameter of the terminal device.

The processor 410 is configured to determine the frequency compensation manner based on the first information, and perform frequency compensation for the uplink signal based on the frequency compensation manner. The frequency compensation manner is a first frequency compensation manner or a second frequency compensation manner. A first compensation value corresponding to the first frequency compensation manner is a frequency offset generated by relative motion between the network device and the apparatus. A second compensation value corresponding to the second frequency compensation manner is a difference between a first threshold and the frequency offset generated by relative motion between the network device and the apparatus.

In another possible implementation, the apparatus 400 is configured to perform processes and steps corresponding to the network device in the foregoing method 200.

The processor 410 is configured to determine first information, where the first information indicates a frequency compensation manner of an uplink signal of the terminal device, or the first information indicates a configuration parameter of the terminal device.

The transceiver 420 is configured to send the first information to the terminal device.

The frequency compensation manner is a first frequency compensation manner or a second frequency compensation manner. A first compensation value corresponding to the first frequency compensation manner is a frequency offset generated by relative motion between the apparatus and the terminal device. A second compensation value corresponding to the second frequency compensation manner is a difference between a first threshold and the frequency offset generated by relative motion between the apparatus and the terminal device.

It should be understood that the apparatus 400 may be specifically the terminal device or the network device in the foregoing embodiments, and may be configured to perform steps and/or processes corresponding to the terminal device or the network device in the foregoing method embodiments. Optionally, the memory 430 may include a read-only memory and a random-access memory, and provide instructions and data to the processor. A part of the memory may further include a non-volatile random-access memory. For example, the memory may further store information about a device type. The processor 410 may be configured to execute instructions stored in the memory, and when the processor 410 executes the instructions stored in the memory, the processor 410 is configured to perform steps and/or processes corresponding to the terminal device or the network device in the foregoing method embodiments. The transceiver 420 may include a transmitter and a receiver. The transmitter may be configured to implement steps and/or processes that correspond to the transceiver and that are used to perform a sending action, and the receiver may be configured to implement steps and/or processes that correspond to the transceiver and that are used to perform a receiving action.

It should be understood that in this embodiment of this application, the processor in the apparatus may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

During an implementation process, the steps in the foregoing methods can be implemented by using a hardware integrated logic circuit in the processor, or by using instructions in a form of software. The steps of the method disclosed with reference to embodiments of this application may be directly performed by a hardware processor, or may be performed by using a combination of hardware and software units in the processor. A software unit may be located in a mature storage medium in the art, such as a random-access memory, a flash memory, a read-only memory, a programmable read-only memory, an electrically erasable programmable memory, or a register. The storage medium is located in the memory, and the processor reads instructions in the memory and completes the steps in the foregoing methods in combination with hardware of the processor. To avoid repetition, details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

This application further provides a communication apparatus on a terminal side, including a communications interface and a logic circuit. The communications interface is configured to receive the foregoing first information, and the logic circuit is configured to perform frequency compensation for an uplink signal based on the first information according to the method in the foregoing embodiments.

This application further provides a communication apparatus on a network side, including a communications interface and a logic circuit. The logic circuit is configured to determine first information according to the method in the foregoing embodiments, and the communications interface is configured to send the first information.

An embodiment of this application further provides a communication system. The communication system may include the terminal device (the apparatus 300 or the apparatus 400 is embodied as the terminal device) shown in FIG. 3 or FIG. 4 and the network device (the apparatus 300 or the apparatus 400 is embodied as the network device) shown in FIG. 3 or FIG. 4.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A frequency compensation method, comprising:
   receiving, by a terminal device, first information from a network device, wherein the first information indicates a configuration parameter of the terminal device, and wherein the configuration parameter comprises timestamp information;

receiving, by the terminal device, second information from the network device, wherein the second information indicates to the terminal device to determine uplink timing information;

determining, by the terminal device, the uplink timing information of the terminal device based on the second information, the timestamp information, and global navigation satellite system (GNSS) time information;

determining, by the terminal device based on the uplink timing information, that the terminal device is in a first moving communication state; and determining, by the terminal device, a frequency compensation manner of an uplink signal of the terminal device as a frequency compensation manner corresponding to the first moving communication state, wherein:

the frequency compensation manner is a first frequency compensation manner or a second frequency compensation manner;

a first compensation value corresponding to the first frequency compensation manner is a frequency offset generated by relative motion between the network device and the terminal device; and a second compensation value corresponding to the second frequency compensation manner is a difference between a first threshold and the frequency offset generated by relative motion between the network device and the terminal device; and performing, by the terminal device, frequency compensation for the uplink signal based on the frequency compensation manner.

2. The frequency compensation method according to claim 1, wherein:
   the first threshold is determined based on a compensation value of a downlink signal of the network device; or
   the first threshold is specified in a protocol.

3. The frequency compensation method according to claim 1, wherein:
   the first information further indicates the frequency compensation manner of the uplink signal of the terminal device; and
   the frequency compensation method further comprises:
      in response to determining that the first information is a first bit value, determining, by the terminal device, the frequency compensation manner as the first frequency compensation manner corresponding to the first bit value; or
      in response to determining that the first information is a second bit value, determining, by the terminal device, the frequency compensation manner as the second frequency compensation manner corresponding to the second bit value.

4. The frequency compensation method according to claim 1, wherein:
   a transmit frequency of the uplink signal is a difference between an absolute frequency of the uplink signal and the first compensation value; or
   a transmit frequency of the uplink signal is a difference between an absolute frequency of the uplink signal and the second compensation value.

5. The frequency compensation method according to claim 1, further comprising determining, by the terminal device based on the configuration parameter, that the terminal device is in the first moving communication state; and determining, by the terminal device, the frequency compensation manner as the frequency compensation manner corresponding to the first moving communication state.

6. The frequency compensation method according to claim 1, wherein:

the configuration parameter further comprises location information of a reference point of the network device; and the frequency compensation method further comprises:

determining, by the terminal device based on the location information of the reference point of the network device, that the terminal device is in the first moving communication state; and determining, by the terminal device, the frequency compensation manner as the frequency compensation manner corresponding to the first moving communication state.

7. The frequency compensation method according to claim 1, wherein the first information further comprises:

at least one of a cell identifier or a beam identifier.

8. The frequency compensation method according to claim 1, wherein the first information is carried in any one of the following messages:

a broadcast message, a handover configuration message, or a measurement configuration message.

9. A frequency compensation apparatus, comprising:

at least one processor; and one or more memories coupled to the at least one processor and storing programming instructions for execution by the at least one processor to:

receive first information from a network device, wherein the first information indicates a configuration parameter of the frequency compensation apparatus, and wherein the configuration parameter comprises timestamp information;

receive second information from the network device, wherein the second information indicates to the frequency compensation apparatus to determine uplink timing information;

determine the uplink timing information of the frequency compensation apparatus based on the second information, the timestamp information, and global navigation satellite system (GNSS) time information;

determine, based on the uplink timing information, that the frequency compensation apparatus is in a first moving communication state; and determine a frequency compensation manner of an uplink signal of the frequency compensation apparatus as a frequency compensation manner corresponding to the first moving communication state, wherein:

the frequency compensation manner is a first frequency compensation manner or a second frequency compensation manner;

a first compensation value corresponding to the first frequency compensation manner is a frequency offset generated by relative motion between the network device and the frequency compensation apparatus; and a second compensation value corresponding to the second frequency compensation manner is a difference between a first threshold and the frequency offset generated by relative motion between the network device and the frequency compensation apparatus; and perform frequency compensation for the uplink signal based on the frequency compensation manner.

10. The frequency compensation apparatus according to claim 9, wherein:

the first threshold is determined based on a compensation value of a downlink signal of the network device; or the first threshold is specified in a protocol.

11. The frequency compensation apparatus according to claim 9, wherein:

the first information further indicates the frequency compensation manner of the uplink signal of the frequency compensation apparatus; and the one or more memories store the programming instructions for execution by the at least one processor further to:

in response to determining that the first information is a first bit value, determine the frequency compensation manner as the first frequency compensation manner corresponding to the first bit value; or in response to determining that the first information is a second bit value, determine the frequency compensation manner as the second frequency compensation manner corresponding to the second bit value.

12. The frequency compensation apparatus according to claim 9, wherein:

a transmit frequency of the uplink signal is a difference between an absolute frequency of the uplink signal and the first compensation value; or a transmit frequency of the uplink signal is a difference between an absolute frequency of the uplink signal and the second compensation value.

13. The frequency compensation apparatus according to claim 9, wherein:

the one or more memories store the programming instructions for execution by the at least one processor further to:

determine, based on the configuration parameter, that the frequency compensation apparatus is in the first moving communication state; and determine the frequency compensation manner as the frequency compensation manner corresponding to the first moving communication state.

14. The frequency compensation apparatus according to claim 9, wherein:

the configuration parameter further comprises location information of a reference point of the network device; and the one or more memories store the programming instructions for execution by the at least one processor further to:

determine, based on the location information of the reference point of the network device, that the frequency compensation apparatus is in the first moving communication state; and determine the frequency compensation manner as the frequency compensation manner corresponding to the first moving communication state.

15. The frequency compensation apparatus according to claim 9, wherein the first information further comprises:

at least one of a cell identifier or a beam identifier.

16. A communication system, comprising a terminal device and a network device, wherein the terminal device comprises:

at least one processor; and one or more memories coupled to the at least one processor and storing programming instructions for execution by the at least one processor to:

receive first information from the network device, wherein the first information indicates a configuration parameter of the terminal device, and wherein the configuration parameter comprises timestamp information;

receive second information from the network device, wherein the second information indicates to the terminal device to determine uplink timing information;

determine the uplink timing information of the terminal device based on the second information, the timestamp information, and global navigation satellite system (GNSS) time information;

determine, based on the uplink timing information, that the terminal device is in a first moving communication state; and determine a frequency compensation manner of an uplink signal of the terminal device as a frequency compensation manner corresponding to the first moving communication state, wherein:

the frequency compensation manner is a first frequency compensation manner or a second frequency compensation manner;

a first compensation value corresponding to the first frequency compensation manner is a frequency offset generated by relative motion between the network device and the terminal device; and a second compensation value corresponding to the second frequency compensation manner is a difference between a first threshold and the frequency offset generated by relative motion between the network device and the terminal device; and perform frequency compensation for the uplink signal based on the frequency compensation manner.

\* \* \* \* \*